(12) United States Patent
Abramson

(10) Patent No.: US 8,930,024 B2
(45) Date of Patent: Jan. 6, 2015

(54) ROBOTIC LAWNMOWER AND CHARGING AND CONTROL SYSTEMS THEREFOR

(75) Inventor: Shai Abramson, Pardesiya (IL)

(73) Assignee: F Robotics Acquisitions Ltd., Pardesia (IL)

( * ) Notice: Subject to any disclaimer, the term of this patent is extended or adjusted under 35 U.S.C. 154(b) by 909 days.

(21) Appl. No.: 13/074,607

(22) Filed: Mar. 29, 2011

(65) Prior Publication Data

US 2011/0234153 A1 Sep. 29, 2011

(30) Foreign Application Priority Data

Mar. 29, 2010 (GB) .................................. 1005259.5

(51) Int. Cl.
*G05B 15/00* (2006.01)
*H02J 7/00* (2006.01)
*G05D 1/02* (2006.01)
*A01D 34/00* (2006.01)

(52) U.S. Cl.
CPC ............ *G05D 1/0265* (2013.01); *G05D 1/0225* (2013.01); *G05D 2201/0208* (2013.01); *A01D 34/008* (2013.01)
USPC .......................................... 700/258; 320/107

(58) Field of Classification Search
USPC ........... 320/DIG. 34, 107; 700/245, 253, 258; 900/901
See application file for complete search history.

(56) References Cited

U.S. PATENT DOCUMENTS

| | | | |
|---|---|---|---|
| 3,665,692 A | 5/1972 | Hughes | |
| 3,721,076 A | 3/1973 | Behrens | |
| 3,759,023 A | 9/1973 | Comer | |
| 5,045,769 A | 9/1991 | Everett, Jr. | |
| 5,210,998 A | 5/1993 | Hojo et al. | |
| 5,426,926 A | 6/1995 | Delery et al. | |
| 5,751,124 A | 5/1998 | Josephs | |
| 5,911,670 A | 6/1999 | Angott et al. | |
| 5,927,657 A | 7/1999 | Takasan et al. | |
| 6,525,509 B1 * | 2/2003 | Petersson et al. | ............. 320/107 |
| 7,720,554 B2 * | 5/2010 | DiBernardo et al. | ........... 700/56 |

(Continued)

FOREIGN PATENT DOCUMENTS

| | | |
|---|---|---|
| DE | 10152726 A1 | 5/2003 |
| EP | 1016946 A1 | 7/2000 |

(Continued)

OTHER PUBLICATIONS

European Search Report mailed Feb. 18, 2014 for EP 13181628.2.

*Primary Examiner* — Richard V Muralidar
(74) *Attorney, Agent, or Firm* — Gerry J. Elman; Elman Technology Law, P.C.

(57) ABSTRACT

A charging and control system for a robotic lawnmower, having a circuit loop that includes several wire segments, of which one or more are boundary wire segments that may define or demarcate the boundary of an area within which the lawnmower is permitted to move; a charging voltage signal, for charging the lawnmower's internal battery, and a positioning voltage signal for assisting the lawnmower in determining its current position, are produced respectively by a power supply and a signal generator, which are both provided within the same housing; the two signals are both communicated from this housing over the same wire segments of the circuit loop; a charging station may then be electrically connected to the circuit loop by an end-user so that the charging voltage signal may in use of the system be communicated to the lawnmower when it is docked at the charging station, thus charging the internal battery of the lawnmower.

21 Claims, 5 Drawing Sheets

(56) References Cited

U.S. PATENT DOCUMENTS

| | | |
|---|---|---|
| 8,295,955 B2 * | 10/2012 | DiBernardo et al. ............ 700/56 |
| 8,634,960 B2 * | 1/2014 | Sandin et al. ................. 700/258 |
| 2001/0047231 A1 | 11/2001 | Peless et al. |
| 2003/0208304 A1 | 11/2003 | Peless et al. |
| 2004/0178767 A1 | 9/2004 | Jeon et al. |
| 2005/0007057 A1 | 1/2005 | Peless et al. |
| 2005/0287038 A1 | 12/2005 | Dubrovsky et al. |
| 2006/0038521 A1 | 2/2006 | Jones et al. |
| 2007/0142964 A1 | 6/2007 | Abramson |
| 2007/0180805 A1 | 8/2007 | Melone et al. |
| 2008/0109126 A1 | 5/2008 | Sandin et al. |
| 2009/0315501 A1 | 12/2009 | Li et al. |
| 2010/0082193 A1 | 4/2010 | Chiappetta |

FOREIGN PATENT DOCUMENTS

| | | |
|---|---|---|
| EP | 1933467 A2 | 6/2008 |
| FR | 2515476 A1 | 5/1983 |
| GB | 384497 A | 12/1932 |
| GB | 2054333 A | 2/1981 |
| GB | 2386971 A | 10/2003 |
| GB | 2394796 A | 5/2004 |
| JP | 09037632 A | 2/1997 |
| JP | 2005341837 A | 12/2005 |
| WO | 03104908 A1 | 12/2003 |
| WO | 2005074362 A2 | 8/2005 |
| WO | 2007109624 A2 | 9/2007 |
| WO | 2008017486 A1 | 2/2008 |

* cited by examiner

ROBOTIC LAWNMOWER AND CHARGING AND CONTROL SYSTEMS THEREFOR

CROSS-REFERENCE TO RELATED APPLICATIONS

Under 35 U.S.C. §119, this application claims priority to UK Provisional Patent Application GB1005259.5, filed Mar. 29, 2010.

BACKGROUND OF THE INVENTION

The present invention relates to robotic systems and may find particular use in robotic lawnmowers, and charging and control systems suitable for robotic lawnmowers.

By their very nature, autonomous machines such as robots represent a significant labour-saving for consumers. Repetitive and time-consuming tasks may now be carried out without significant supervision or instruction by the user of such autonomous machines. In order to further reduce the amount of supervision and instruction necessary, sophisticated control systems have been proposed that further increase the independence of the machines. Additionally, where an autonomous machine is able to move, in order to increase its independence of the user it may be provided with a chargeable internal power-source and be programmed, or otherwise configured, to engage with a charging station in order to re-charge the internal power-source.

Robotic lawnmowers are a particularly commercially successful example of such an autonomous machine, substantially reducing the time and effort required on the user's part in order to maintain a neatly-kept lawn. Typically, robotic lawnmowers will be provided with an internal power-source and will return periodically to a charging station to recharge this power source, as described above. Such an internal power-source obviates the need for power cabling connected to the lawnmower during use, which could become tangled, or severed by the blade of the lawnmower.

The charging station for the lawnmower may be positioned within the working area or at its boundaries, so that when the robot battery is getting flat, the robot may automatically return to the charging station to charge the internal power-source for the next operation. The charging station is provided with a power supply, usually at low voltage (less than 48V to prevent electric shock), which may be linked by an electrical cable to an indoor outlet, or a protected outdoor mains outlet, or alternatively to a charger.

Robotic lawnmowers also include control systems, as described briefly above, in order to govern, amongst other things, the movement of the lawnmower and the operation of its blade. There is typically provided, as part of such a control system for currently-available robotic lawnmowers, a position locating network that enables the lawnmower to sense its current relative position, when it is operating away from the charging station.

A typical example in a commercially available system is a boundary wire that is utilised to demarcate a working area, within which the lawnmower is permitted to move. Such a boundary wire generally carries a low-frequency, low-voltage signal that may be detected by the robot so that the robot can locate its relative position to the wire and in particular, whether it is inside or outside of the boundary wire loop and its proximity to the wire. Typically, the signal is generated by a signal generator device that forms a further part of the charging and control system and is linked directly to the boundary wire, so as to limit losses that would be experienced over any linking wiring, and also to avoid the increase in cost that is associated with such linking wiring.

The signal generator, being an active component, also requires a power source and typically therefore shares the power source of the charging station. Since both the charging station and the signal generator are both commonly desired to be in close proximity to the boundary wire, they are therefore often located in close proximity to each other.

Accordingly, the signal generator is located outdoors and thus a well-sealed enclosure to the electronics is required, which ideally would be able to sustain the winter. Alternatively, the user is required to disconnect the signal generator and bring it indoors during the winter to prevent damage by the weather.

Since it may be desirable, for the reasons noted above, to locate the charging station and signal generator in close proximity it has further been proposed to provide both the charging station and the signal generator within the same weather-proofed housing, so that only one weather-proofed housing is required. However, such a system complicates maintenance for the end-user, since the whole housing may need to be returned, even if only the signal generator is defective.

Further, while it might generally be desirable that the charging station be placed relatively close to its power supply, it may be desirable given, for example, the particular topography or obstacles present, for the charging station to be placed a long distance from its power supply. An example of such a situation is where a garden is sloped away from the power supply: if the charging station is placed close to the power supply, the robot must travel uphill to recharge and may run out of charge in an attempt to do so before reaching the charging station; however, if the charging station is placed at the bottom of the slope a very long power cable may be required to stretch from the power supply to the charging station.

Often an end-user may wish to carry out several test-runs with the lawnmower to discover where the most effective place to situate the charging station is. In a case, such as that just described, where the most effective performance is felt when the charging station is far from its power supply, the end-user may need to buy a longer power cable than the one in their possession, or an extension cable, or the like. Thus, the end-user may be left with the undesirable prospect of having to invest yet more money into making a system that he has already purchased work optimally.

SUMMARY OF THE INVENTION

The present invention seeks to overcome the problems highlighted above and may in particular provide a more cost-effective charging and control system for a robotic lawnmower.

Thus, in accordance with a first aspect of the invention of the following disclosure, there is provided a charging and control system for a robotic lawnmower, comprising a circuit loop, the circuit loop comprising one or more wire segments, including one or more boundary wire segments defining the boundary of an area within which said lawnmower is permitted to move; wherein a charging voltage signal, for charging a power source within said lawnmower, and a positioning voltage signal for assisting the lawnmower in determining its current position, are both communicated over the same one or more of said plurality of wire segments; wherein a charging station may be electrically connected to said one or more of said plurality of wire segments so as to be operable to communicate said charging voltage signal to said lawnmower when positioned at said charging station.

By communicating both the positioning and charging voltage signals over the same one or more of said plurality of wire segments, the components producing the positioning and charging voltage signals may be located remotely of the charging station, and, advantageously, may be located indoors or in a sheltered area so as to obviate the need for weather-proofing and thus reduce the cost of the system.

Further, as both signals are communicated over the same one or more of the plurality of wire segments, the end-user may be given some flexibility over where to connect the charging station. Thus, it may be placed in a position that maximizes the effectiveness of the robot's performance without requiring additional cabling.

Preferably, the positioning voltage signal is communicated over the boundary wire segments. In embodiments, the positioning voltage signal may be communicated on substantially all of the wire segments of the circuit loop.

In addition, or otherwise, the charging station may comprise at least one component having a capacitance sufficient to substantially block the passage of said charging signal. As a result, or otherwise, the charging station may separate the wire segments of the circuit loop into two groups: a first group that communicates both the positioning and charging voltage signals and a second group that communicates the positioning signal but not the charging voltage signal. In some embodiments, the second group may consist of the boundary wire segments.

As noted above, in currently-known systems, both the charging voltage and the positioning voltage signals are communicated over different wiring since the manner in which each of these voltage signals acts on the robotic lawnmower differs significantly. For example, in known systems the charging voltage signal is typically applied to the robotic lawnmower by a direct electrical connection, whereas the positioning voltage signal is, by contrast, transmitted wirelessly by the boundary wire.

However, the Applicant has made the realization that since the two voltage signals may be required during mutually exclusive periods of time—if the lawnmower is charging, its position is inherently known—it may be straightforward to implement a system where they are communicated on the same wire segment. It should, however, be noted that it is not essential for the two signals to be provided at mutually exclusive times, as will be explained in more detail below in the detailed description of embodiments of the present invention.

Suitably, the system may further comprise: a power supply, operable to produce said charging voltage signal; and a signal generator, operable to produce said positioning voltage signal; wherein said power supply and said signal generator are electrically connected to said circuit loop. Preferably, the power supply and the signal generator are provided within a housing located remotely from the charging station, and more preferably the housing is electrically connected to the charging station by one or more of said at least one wire segments communicating both said charging and said positioning voltage signals.

Advantageously, the housing may further provide an interface for remotely controlling and/or indicating the status of said lawnmower. This interface may preferably include controls and or indicators selected from the group consisting of: a control, which, upon actuation, causes a lawnmower positioned at said charging station to depart from the charging station to carry out desired tasks; a control, which, upon actuation, causes a lawnmower positioned remotely from said charging station to return to the charging station; an indicator, which signals whether the lawnmower is currently present at the charging station; an indicator, which signals whether the lawnmower has returned to the charging station within pre-determined time-limit.

an indicator, which signals whether the position of the lawnmower has left its working area.

In accordance with the first aspect of the present invention, there is also provided a method for operating a robotic lawnmower, comprising the steps of: providing a circuit loop comprising a plurality of wire segments, including one or more boundary wire segments defining the boundary of an area within which said lawnmower is permitted to move; producing a charging voltage signal for charging a power source within said lawnmower; producing a positioning voltage signal; communicating both said charging and said positioning voltage signals over the same one or more of said plurality of wire segments in said circuit loop; and transmitting a wireless positioning signal, corresponding to said positioning voltage signal, to said lawnmower, said lawnmower determining its current relative position based on said wireless positioning signal.

Whilst the possibility of providing a power supply and signal generator within a housing located remotely from a charging station, with that housing providing an interface for remotely controlling and/or indicating the status of a robotic lawnmower, has been proposed above as an advantageous embodiment according to the first aspect of the present invention, the Applicant considers that these features may also be advantageous in a different and/or broader context.

Thus, according to a further aspect of the present invention, there is provided a charging and control system for a robotic lawnmower comprising: a power supply, operable to produce a charging voltage signal; a signal generator, operable to produce a positioning voltage signal; a charging station, electrically connected to said power supply so as to receive said charging voltage signal, and comprising one or more terminals operable to connect to said lawnmower so as to communicate said charging voltage signal to said lawnmower when positioned at charging station; and a position locating network, operable to receive said positioning voltage signal from said signal generator and to transmit a corresponding wireless positioning signal for reception by said lawnmower; wherein said power supply and said signal generator are provided within a housing located remotely from said charging station, and said housing further provides an interface for remotely controlling and/or indicating the status of said lawnmower.

By providing the power supply and signal generator remotely of the charging station, these components may be located indoors or in a sheltered area so as to obviate the need for weather-proofing of the signal generator and thus reduce the cost of the system. Further, since the signal generator is located remotely of the charging station, an interface for remotely controlling and/or indicating the status of the lawnmower may be provided on the housing of the signal generator so as to allow the user to control the lawnmower and/or without necessarily having to leave the house and/or without the lawnmower necessarily being visible to the user.

Preferably, the interface includes controls and or indicators selected from the group consisting of: a control, which, upon actuation, causes a lawnmower positioned at said charging station to depart from the charging station to carry out desired tasks; a control, which, upon actuation, causes a lawnmower positioned remotely from said charging station to return to the charging station; an indicator, which signals whether the lawnmower is currently present at the charging station; an indicator, which signals whether the lawnmower has returned to the charging station within pre-determined time-limit; and an indicator, which signals whether the position of the lawnmower has left its working area.

Suitably, the housing is electrically connected to the charging station by one or more wire segments, at least one of which communicates both said positioning voltage signal and said charging voltage signal. The position locating network may be electrically connected to said housing via said charging station and preferably may be connected to the housing via said one or more wire segments.

Optionally, the interface effects control over the lawnmower by transmitting a wireless control signal from said position locating network for reception by said lawnmower. Additionally, or otherwise, the interface may effect control over the lawnmower by means of an electrical connection between the lawnmower and the charging station; preferably, this electrical connection comprises at least one of the aforementioned one or more terminals operable to connect to said lawnmower so as to communicate said charging voltage signal to said lawnmower. Thus, these terminals may communicate both a charging voltage signal and a control voltage signal.

Preferably, said position locating network comprises a wire loop, preferably wherein said wire loop defines the boundary or perimeter of an area within which the lawnmower is permitted to move. Alternatively, the position locating network may comprise a plurality of individual radio transmitters or transceivers.

The charging and control system may further include a robotic lawnmower operable to receive said wireless positioning signal and thereby determine its current relative position. In addition, or otherwise, the robotic lawnmower may be operable to receive the aforementioned wireless control signal; further, the robotic lawnmower may be operable, upon receipt of said wireless control signal, to transmit a wireless response signal and, optionally, the aforementioned interface may be operable to indicate to the user information based on said wireless response signal. Such features may be particularly advantageous where the interface includes an indicator, which signals whether the position of the lawnmower has left its working area.

Optionally, the robotic lawnmower may, particularly where the aforementioned interface effects control over the lawnmower by means of an electrical connection between the lawnmower and the charging station, be operable to communicate a response voltage signal to said charging station; this may be by means of the aforementioned electrical connection and, suitably, the aforementioned terminals of the charging station. Such features may be particularly advantageous where the aforementioned interface includes: a control, which, upon actuation, causes a lawnmower positioned remotely from said charging station to return to the charging station; an indicator, which signals whether the lawnmower is currently present at the charging station; and/or an indicator, which signals whether the lawnmower has returned to the charging station within pre-determined time-limit. The aforementioned interface may suitably be operable to indicate to the user information based on said response voltage signal.

Further difficulties may exist in controlling a robotic lawnmower. As is noted above, a control system for a robotic lawnmower will typically include a position locating means, such as a perimeter wire that demarcates a working area and wirelessly transmits a signal to the robotic lawnmower so that the lawnmower can sense its current relative position. Such position locating means may be useful for indicating the boundary of an area, but are typically less suitable for indicating linear or point features. Therefore, it is often desirable to provide electronic markers in addition to, or instead of a boundary wire.

However, since the markers are installed in various points at the garden, not necessarily close to electricity sources, it may be desirable that such control stations are battery operated and last for long periods and even if not battery operated, it is desirable that the power consumption by the control stations be minimized.

Thus, according to a still further aspect of the present invention, there is provided a control station for controlling the behaviour of a robotic lawnmower, comprising a sensor for detecting a wirelessly transmitted activation signal, wherein, upon receipt of said activation signal, the control station is operable to switch from a low-power mode to an active mode, wherein the control station transmits a control signal to said lawnmower, thus reducing power consumption by the control station.

Preferably, the activation signal is transmitted by a wire loop that defines the perimeter of an area within which the lawnmower is permitted to move. More preferably, the activation signal is transmitted over radio-frequency wavelengths and more preferably still, in the aforementioned low-power mode, the sensor is operated only periodically so as to further reduce power consumption.

Suitably, the sensor is operable to detect an activation signal transmitted wirelessly by a robotic lawnmower, and preferably the activation signal is transmitted over infra-red wavelengths; more preferably the sensor is a passive-IR device.

According to the same aspect of the present invention, there is also provided a robotic lawnmower comprising a wireless transmitter operable to transmit an activation signal to a control station, so as to enable said control station to be activated only when said lawnmower is nearby, thus reducing power consumption by said control station, preferably wherein said activation signal is transmitted over infra-red wavelengths.

It should be noted that the meaning of the terms "wireless" and "wirelessly" as used above in regard to the aspects of the invention are intended to include a number of forms of communication that do not require direct electrical connection, such as RF, IR, and magnetic forms of communication and should not be interpreted as implying the use of a particular standard communication protocol.

BRIEF DESCRIPTION OF THE DRAWINGS

The invention will now be described with reference to the accompanying drawings, in which.

DETAILED DESCRIPTION OF THE INVENTION WITH REFERENCE TO THE DRAWINGS

Figure 1:
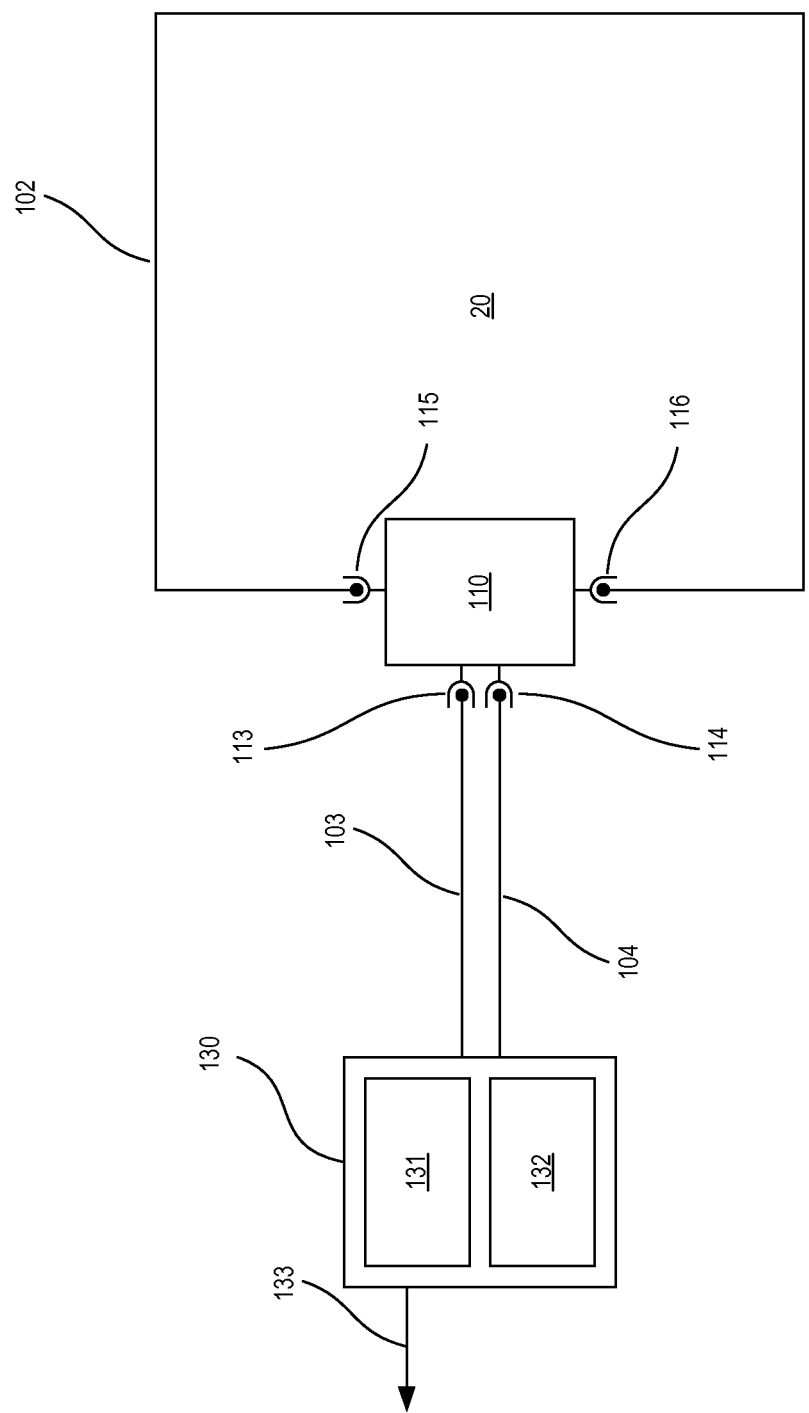
FIG. 1 shows a charging and control system according to a first embodiment of the present invention, where a charging station is located so as to electrically connect two parallel lead wires with a boundary wire loop.

An embodiment of the first aspect of the present invention is shown in FIG. 1; a power supply (132) and signal generator (131) are provided within the same housing (130), which is connected to wiring (102-104) forming a circuit loop including the charging station (110). The housing (130) is also connected via mains supply wire (133) to a mains electrical supply.

In more detail, the charging station (110) is linked to the housing (130) for the power supply (132) and signal generator (131) by two lead wires (103, 104), which extend parallel to one another. As shown in FIG. 1, the two lead wires (103, 104) connect with the charging station (110) by means of sockets (113, 114). The power supply (132) delivers low voltage power to the charging contacts in the charging station (not shown) via the two lead wires (103, 104). When the robot docks to recharge its internal battery or other rechargeable power supply, it connects to the charging contacts of the charging station.

The charging station (110) also electrically connects the two lead wires (103, 104) to a boundary wire (102) that defines a demarcated area (20) in which the robot operates. In the system depicted in FIG. 1, the connection is provided by the lead wire sockets (113, 114), internal wiring within the charging station, and boundary wire sockets (115, 116). This connection allows a positioning signal produced by the signal generator to travel over the lead wires (103, 104) to the boundary wire (102).

When the robot is present at the charging station (110) (the presence of the robot being sensed, for example, by current being drawn through the lead wires (113, 114)) the power supply (132) is connected directly to the charging contacts, thus allowing the charging voltage signal to be communicated to the robot via the lead wires (113, 114) and hence charging the robot with a DC current.

The charging station (110) may include one or more capacitor components (136 and 138, shown in FIG. 2) whose capacitance acts to block the passage of the charging voltage signal to the boundary wire (102). Thus, while the boundary wire (102) is still connected during the charging operation, the signal generator may be deactivated in response to the current being drawn through the lead wires (113, 114) and hence substantially no voltage signal may be present in the boundary wire (102) during the charging operation. When the robot departs from the charging station (110), the signal generator sends an AC signal to the boundary wires (102). This signal passes through the capacitor components (136 and 138, shown in FIG. 2) unhindered and generates the desired positioning voltage signal in the boundary wire.

Alternatively, both a DC charging voltage signal and an AC positioning voltage signal may be sent over the wires at all times, with an array of filtering components including both capacitance and inductance being used to substantially restrict the DC component to the boundary wire (102) and the AC component to the charging contacts.

Figure 2:
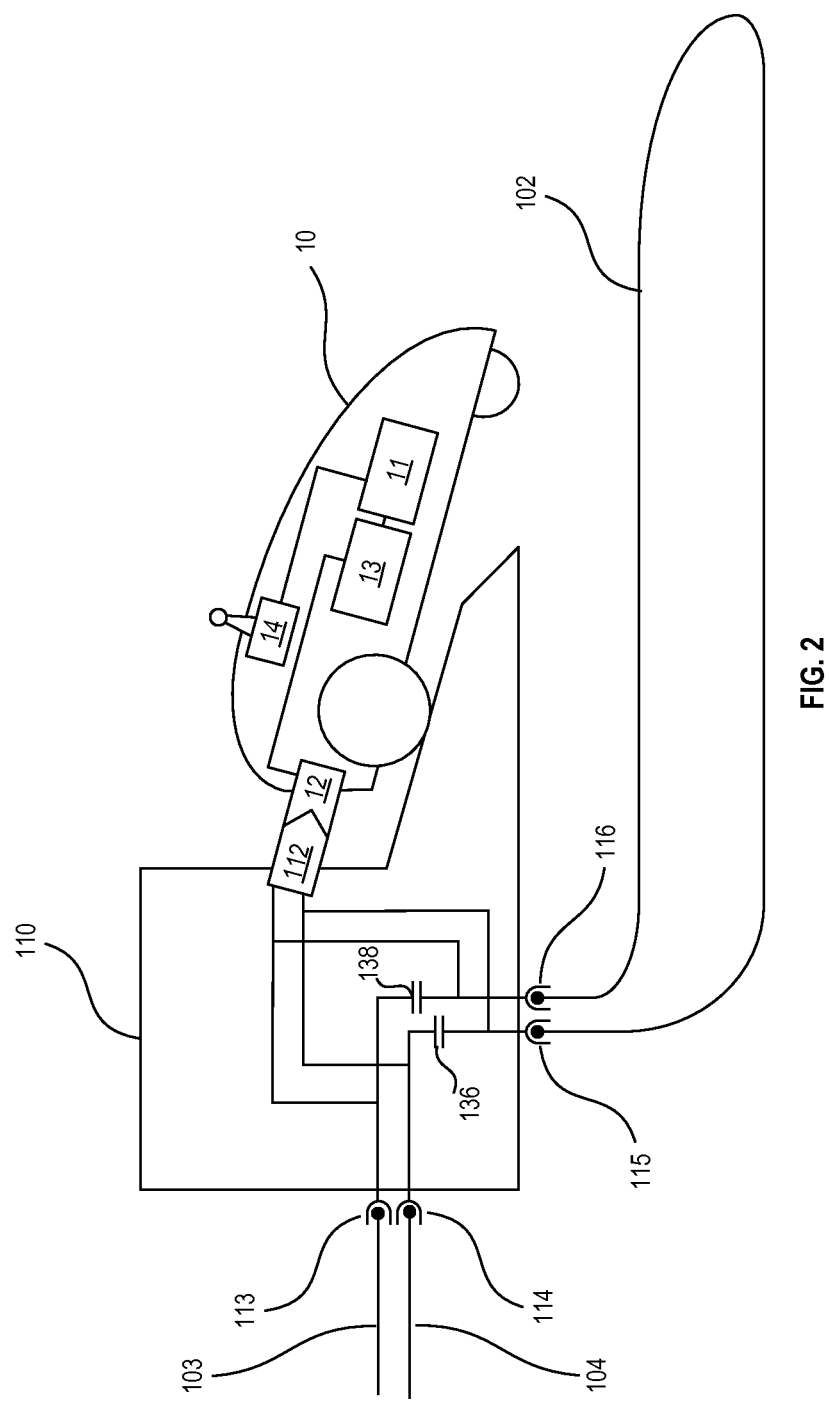
FIG. 2 shows the charging station of the embodiment of FIG. 1 in more detail, and also illustrates a robotic lawnmower in accordance with aspects of the present invention.

FIG. 2 shows in more detail the charging station (110) used in the system of FIG. 1, with a robotic lawnmower (10) present at the charging station (110). As may be seen in FIG. 2, the charging station (110) provides charging terminals or pins (112) that mate with corresponding pins or terminals provided on the lawnmower (12). In addition to enabling the communication of a charging voltage signal between the housing (130) and the lawnmower (10), the connection between the terminals (12, 112) may allow control voltage signals to be communicated from the housing. These signals may correspond to commands that the lawnmower (10) will carry out, or to telemetry data to be utilised by the lawnmower. Thus, this connection may allow the housing to cause the lawnmower to depart the charging station (110).

It may of course be suitable for the system to be arranged so that two-way communication of signals is carried out over this connection. Thus, the lawnmower may communicate a response voltage signal to the charging station (110) and thereafter to the components in the housing (130). This may allow the lawnmower (10) to send data regarding its current status, such as if its components are malfunctioning, and/or to report on its recent activity.

FIG. 2, also shows in detail some of the features of the robotic lawnmower. The lawnmower is shown as being provided with charging pins (12), which correspond with charging pins (112) provided on the charging station and may mate during docking of the robot with the charging station. The robot shown is further provided with an internal rechargeable battery, acting as a power source for the robot, a transmitter/receiver (14) for sensing instructions via wireless communication protocols, and for detecting positioning signals transmitted by the boundary wire (102). The positioning signals received are analysed by logic and control circuitry (11), which is connected to the power source (13). The robot will, of course, also include further components, such as a drive motor, steering system, and a blade deck and motor, although these components are not shown in the schematic representation of FIG. 2.

As may also be seen in FIG. 2, the wiring within the charging station (110) directly connecting the lead wire sockets (113, 114) and the boundary wire sockets includes two capacitor components (136, 138), which, as described above, may block the passage of a DC charging voltage signal to the boundary wire (102).

Figure 3:
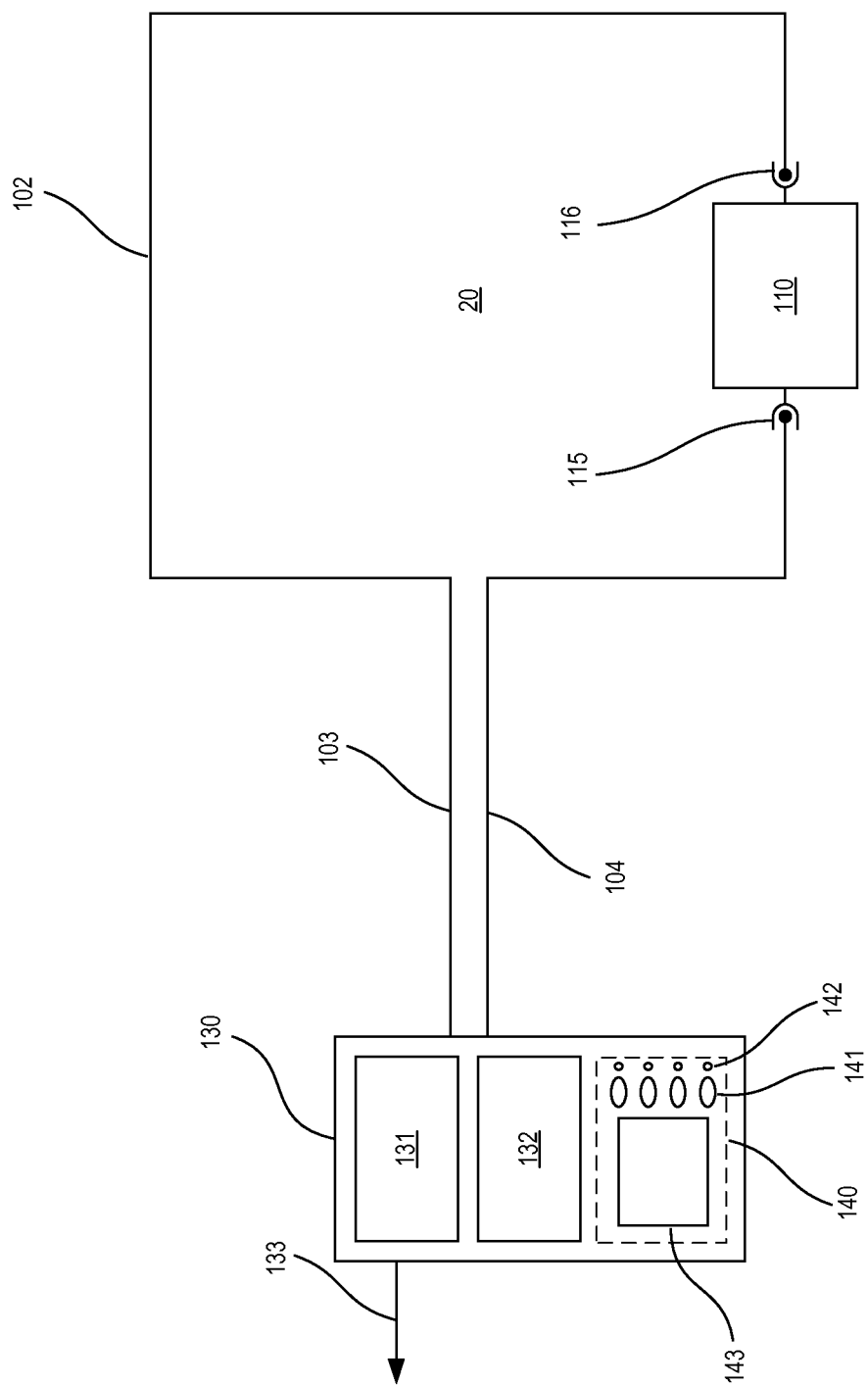
FIG. 3 shows a charging and control system according to a further embodiment of the present invention, where a charging station is connected directly to a boundary wire loop.

According to a further embodiment of the present invention, which is illustrated in FIG. 3, the charging station may be connected to the boundary wire (102) but away from the lead wires (103, 104), with the lead wires leading directly from the housing (130) of the power supply (131) and signal generator (132) to the boundary wire (102) that defines the demarcated area (20).

The system of FIG. 3 may utilise the charging station shown in FIG. 2; thus, the two ends of the boundary wire (102) may be connected to the boundary wire sockets (115, 116). As illustrated in FIG. 2, the wiring linking the boundary wire sockets (115, 116) directly to the charging terminals (112) bypasses the capacitor components. This bypass allows an AC positioning voltage signal and a DC charging voltage signal to be produced by the components of the housing (130) at all times, since the charging station (110) will allow the charging voltage signal to reach the charging terminals (112) regardless of whether the wiring (102-104) is connected as in FIG. 1 or FIG. 3.

Thus, it should be appreciated that the systems of FIGS. 1 to 3 present the end-user with increased flexibility. Specifically, it will be appreciated that the charging station of FIG. 2 could be located at any point on the boundary wiring, which may enable the end-user to experiment with the charging station in several locations to discover the most effective setup.

Indeed, the system may be provided as only a single boundary wire loop (102) connected to a housing (130) containing the power supply (132) and signal generator (131), with the end-user deciding where on this loop to connect the charging station (110) and whether to attach the wire loop to all four sockets (113-116) for a configuration similar to that in FIG. 1, or to attach the loop (102) to only the boundary wire sockets (115, 116). The lead wires (103, 104) in some cases may therefore either not be provided at all, or simply be provided by way of the end-user fastening together the excess wiring from the beginning and end sections of the loop of boundary wire (102).

It should be noted that configurations where the charging signal is carried over a significant length of the boundary loop (102) may present higher electrical losses; in particular this may occur in cases where the perimeter is long. Thus, the configuration shown in FIG. 1 may represent a particularly energy-efficient setup, since it will block the passage of the charging voltage signal over the boundary wire segments (102). Higher losses may also occur where the charging current is high.

However, in either case, these losses may be offset by the increased flexibility and decreased cost of the system. Further, when compared to currently-known systems having a separate wire for a charging station, the routing of cabling may be made significantly easier for the end-user, since only a single loop of cable may need to be managed.

As previously mentioned, in the systems shown in FIGS. 1 to 3, the only electronics required outdoors are the connections to the charging station (110), including any capacitor components (136, 138), and boundary wires (102). These elements can be engineered to withstand a wide variety of weather conditions so that the user is not required to dismount the charging station during the winter and store it indoors.

Accordingly, it may no longer be necessary to weatherproof the housing (130) containing the power supply (132) and signal generator (131) and thus, the end-user may choose to locate the housing (130) indoors. It is envisaged that several features and functionalities may be provided to the user by locating the perimeter signal generator (131) inside the customer's house, or in an easily-approached area.

In particular, as illustrated figuratively in FIG. 3, the housing (130) may be provided with a simple interface (140) for remotely controlling and/or indicating the status of the lawnmower. Such an interface may comprise a combination of LEDs, LCD displays, buttons, switches and the like provided on the exterior of the housing (130), connected to control circuitry within the housing (not shown). In the specific example shown in FIG. 3, the housing (130) is provided with an array of buttons (141) with an array of respective LEDs used to indicate the statuses of functions associated with the buttons. There is also provided a small LCD display screen (143), which may show more detailed status information to the user.

The following are particular examples of desirable functionalities for such an interface:

Manual departure: while the robot is in the charging station, it is possible to press a button (141) on the housing (130) of the perimeter signal generator (131) which will activate a signalling protocol to initiate a manual departure of the robot (10) (rather than or in addition to the automatic departure set by a programmable mowing schedule). Such signalling implemented by controlling the voltage signal in the boundary wire (102). In particular, the signal generator (131) within the housing may produce a control voltage signal that is communicated over the boundary wire (102) and thus produces a wireless control signal that the robot receives by way of transmitter/receiver (14). Such signalling can be achieved by a simple timed on/off pattern of the positioning voltage signal normally sent through the boundary wire (102), or modulating the signal in a manner that will be reliably detected by the robot. Of course, it is also possible to multiplex both a control voltage signal and a positioning voltage signal over the boundary wire (102), either by time-divided or code-divided multiplication.

Alternatively, the signal generator (131) may produce a control voltage signal that is communicated over the charging terminals (112) provided by the charging station (110). Thus, a control voltage signal may be applied directly to the charging terminals (12) provided by the robot (10). By way of background, EP1933467 gives some useful examples of methods for signalling and control of a robotic lawnmower.

Manual 'Go to charging station': while the robot (10) is operating, it is possible to press a button (141) on the interface (140) provided on the housing (130), which will activate a signalling protocol, which again will be transmitted by the boundary wire (102) to the transmitter/receiver (14) provided on the robot (14), so as to instruct the robot to return to the charging station (110). Optionally, the robot may be able to transmit, using transmitter/receiver (14) information relating to the current level of charge in its power source. This information may be indicated on-screen (143) by the interface (140).

Robot in the Charging Station: while the robot is charging, an indicator such as one of the LEDs (142) provided on the interface (140), can indicate that the robot is indeed in the charging station, without having to go outside and actually view the robot (10).

'Robot not in the charging station' warning: since the perimeter signal generator (131) may also control the robot's charging, it can warn (audibly or visually) if the robot did not get back to the charging station (110) within a pre-determine time. This feature is important in gardens where the robot may get stuck and not return to the charging station (110).

Anti-theft alarm: when the robot is departing from the charging station (110) automatically (by schedule or by 'manual depart' command as described above), the charging station (110) can communicate with the perimeter signal generator (131) and acknowledge the departure (a sample protocol is described in EP1933467). If the robot (10) is pulled from the charging station without the required communication, an audible and visual alarm can be activated at the perimeter signal generator indicating that the robot has been used without authorization (which may indicate theft of the robot). An indoor alarm on the perimeter generator can be much more efficient than an alarm on the robot itself, and avoid disruption to the neighbours.

Further, the system may be arranged to periodically check the location of the lawnmower during mowing operations, for example by the robot periodically transmitting information using its transmitter/receiver (14) regarding its current position (as is noted above, the boundary loop (102) system allows the robot to determine very easily whether it is within the loop). If the robot's position expectedly changes—for example by leaving the demarcated area (20) the signal generator (131) may be operable to signal the robot to shut-down and/or the interface may be operable to produce an alarm.

While a loop of boundary wire (102) forms part of the systems in the embodiments shown in FIG. 1 and FIG. 2, it is considered that the concept of providing a power supply (132) and a signal generator (131) within a single housing (130) located remotely from a charging station (110), with the housing (130) also providing an interface (140) for remotely controlling and/or indicating the status of a lawnmower may be applied more widely. In particular, while the embodiments of FIGS. 1 to 3 use a wire loop in order to assist the lawnmower in determining its relative position, it is considered that the wire loop may be thought of as a specific example of a position locating network.

Figure 4:
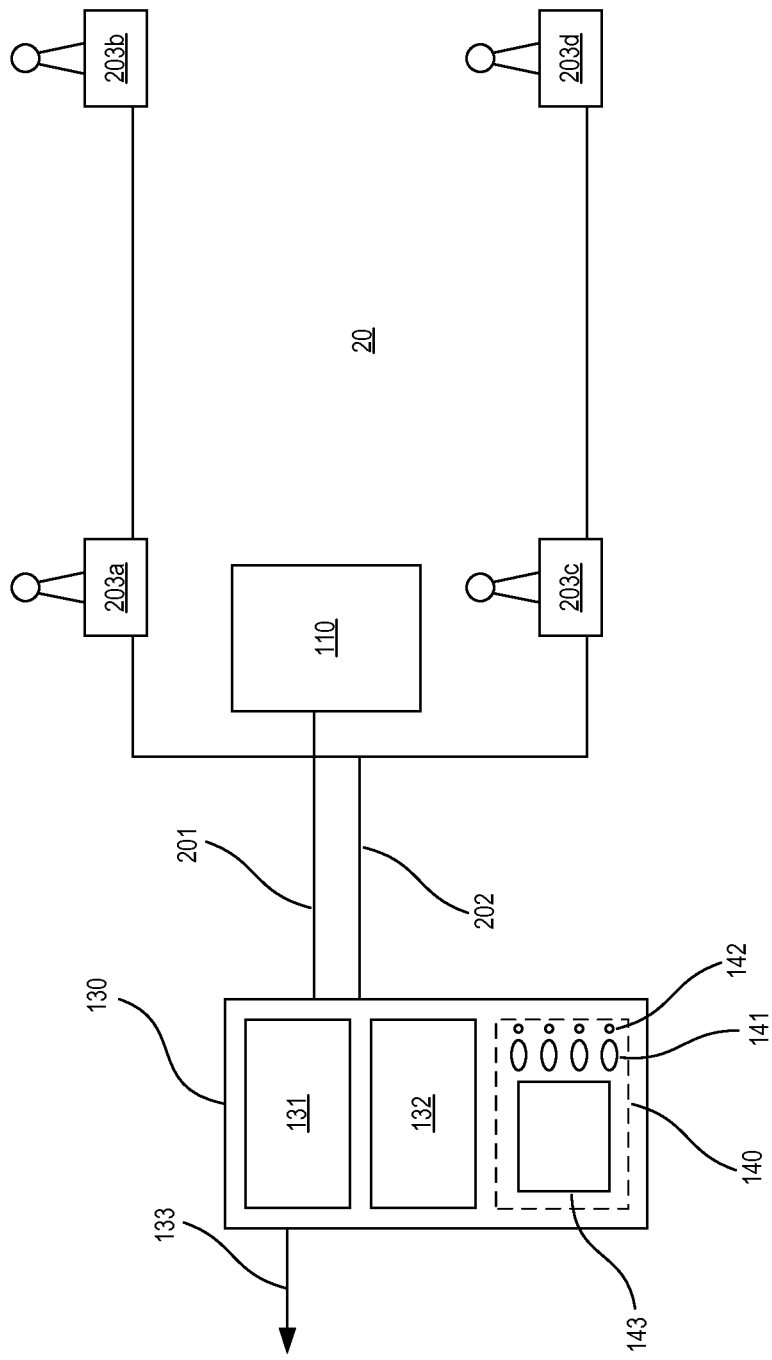
FIG. 4 illustrates an embodiment of a second aspect of the present invention, where several discreet transmitters are utilised to assist a lawnmower in determining its position and where charging and positioning signals are communicated over separate wiring.

FIG. 4 therefore illustrates a further embodiment where a network of several discreet radio transmitters (203a-203d) is utilised to enable the lawnmower to determine its position. A lawnmower utilised in the system of FIG. 4 may utilise a combination of the relative signal strength and phase of the signals received in order to determine its current position. Thus, in order to assist in this determination, the transmission of signals from the radio transmitters (203a-203d) may be synchronised and the absolute strengths of the signals equalised.

In further contrast to the embodiments of FIG. 1 and FIG. 2, in the charging and control system of FIG. 3, separate wiring is used to communicate the positioning signal to the transmitters (203a-203d) and to communicate the charging voltage signal to the charging station (110). Specifically, a charging signal cable (201) connects the housing (130) for the signal generator (131) and power supply (132) with the charging station (110), while a positioning signal cable (202) connects the housing (130) with the transmitters (203a-203d).

As with the embodiment of FIG. 3, the housing (130) of FIG. 4 is provided with a control and status indication interface (140), which includes respective arrays of buttons (141) and LEDs (142), in addition to an LCD display screen (143).

It will be apparent to the skilled reader that the interfaces (140) of FIGS. 3 and 4 for controlling and/or indicating the status of the lawnmower provided on the housing (130) of the signal generator (131) may be provided with further features, without departing from the scope of the invention. Equally, it will be appreciated that such an interface could easily be included in the system of FIG. 1.

Figure 5:
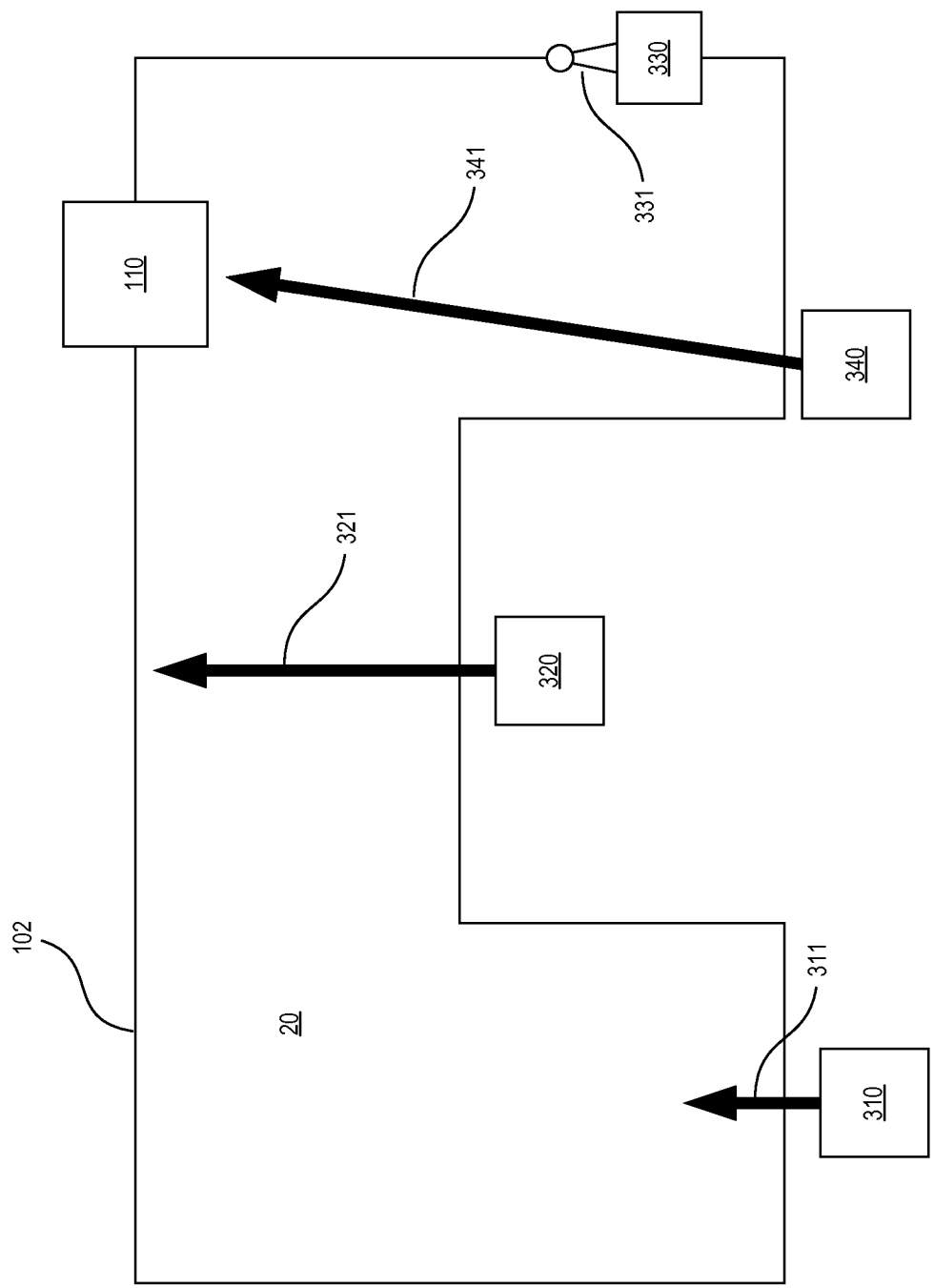
FIG. 5 shows examples of electronic markers in accordance with a further aspect of the present invention that may be utilised as part of a control system for a robotic lawnmower according to other aspects of the present invention.

FIG. 5 illustrates examples of electronic markers according to embodiments of a further aspect of the present invention. As is noted above, a control system for a robotic lawnmower will typically include a position locating means, such as the boundary wire (102) of FIGS. 1 to 3, or the network of radio transmitters (203a-203d), which may demarcate a working area (20) and wirelessly transmit a signal to the robotic lawnmower so that the lawnmower can sense its current relative position. Such position locating means are useful for indicating the boundary of an area, but may be less suitable for indicating linear or point features. Therefore, it is often desirable to provide a number of discreet electronic markers in addition to, or instead of a boundary wire.

These markers may be considered as control stations forming part of an overall control system for the robotic lawnmower. Such control stations can be implemented using various technologies for wireless communication, such as Infrared (also described in US 2008/0281481), RF, magnetic and the like.

The following—which are illustrated in use in FIG. 5—are examples of such markers:

1. Entry Point:
   A marker (310) may be provided that may indicate to the robot a particular point within an area (which may be demarcated by a boundary wire (102)) through which it is preferred that the robot enters and leaves. This point may provide the robot with a path substantially free of obstacles. The marker (310) may utilise a beam (311) that is limited in its coverage of the area (20) to a small footprint where it may be detected.

2. Homing:
   A further type of marker (330) may indicate, for example by means of a transmitter (330), a homing point for the robot, so that the robot is instructed to move towards the signal, for example by sensing the increasing strength of the signal. Such homing markers (330) may be particularly beneficial in cases where a charging station (110) is not used and the homing point may hence be a marked point to which the robot can return at the end of a mowing operation.

3. Guiding Marker:
   A still further type of marker (340) may also indicate with a directional beam (431) a particular linear path that the robot should follow. Such a guiding marker (340) can thus provide the robot with directional information such as how to rapidly reach the charging station (110). When the robot passes across and receives the marker beam (341), it can 'ride' on the beam until it reaches a point on the boundary intersected by the beam's path—the location the beam is pointing at.

4. Plot Separator:
   A yet further type of marker (320), with a similar directional beam (321) to a guiding marker (340), may be used to split a large plot to sub-plots, allowing the robot to work on each specific sub-plot in turn. The robot may be programmed to "bounce back" every time it reaches the beam, as if it were the boundary (102).

Such electronic markers may be considered more broadly as specific examples of control stations for controlling the behaviour of robotic lawnmowers. As was noted above, electronic markers in general will typically be installed in various points within a garden, not necessarily close to electricity sources. A central purpose of any robotic system being to reduce labour required of a user, it is clearly undesirable that such control stations require regular maintenance. Thus, it may be desirable that such control stations are battery operated and last for long periods and, even if not battery operated, it is desirable that the power consumption by the control stations be minimized.

Broadly speaking, a control station according to the aspect of the present invention described below may improve energy efficiency by sensing the presence of an activation signal and thus being activated only for a limited period of time afterwards. The remainder of the time the control station may be kept in a low-power or stand-by mode, thus extending the lifetime of its battery.

According to a first embodiment of this aspect of the present invention, where a perimeter loop is provided that carries a positioning voltage signal to aid the lawnmower in locating its current position, the control station can use this positioning voltage signal as an activation signal, so that it is activated only when this signal is present. During the "off" periods of the perimeter, the control station can operate its sensor only periodically (for example, every 10 seconds) to search for a signal, and thus further preserve energy.

Alternatively, the activation signal may still be transmitted by the perimeter wire, but may be a different signal to the positioning voltage signal that is used by the lawnmower, specifically designated for the activation of the control station, so that the control station may be selectively activated independently of when the perimeter wire is used for locating the position of the lawnmower.

According to a further embodiment of the same aspect of the present invention, the marker may be activated by a signal transmitted by the robot. Since markers are generally located on the perimeter of the working area, the robot may travel along the perimeter at the beginning of the operation, and activate the marker or other control station when it reaches its vicinity. Thus, the signal transmitted by the robot need only be a short-range signal, such as infra-red.

Additionally, the operation time of the control station after each activation can be pre-determined according to its function. For example, an "entry point" marker—as described above—should be activated only for a short time, since the robot will near the marker only a short time after its activation. In this case, the robot may transmit an activation signal by infra-red to activate the "entry-point" marker for only a brief period of time and soon after the lawnmower has moved away from the marker it will return to stand-by mode, thus conserving power. Guiding markers need to be activated for a period which will allow the robot to pass the distance from the marker to the pointing headed location. Plot separators may be operated for a period covering the entire operation, since the robot can approach the separating beam at any point during the operation.

Further to the energy management described below, the control stations may use rechargeable batteries and be provided with solar panels in order to recharge these batteries.

It should be noted that the meaning of "wireless", as used above, is intended to include numerous forms of communication that do not require direct electrical connection, such as RF, IR, and magnetic forms of communication.

Those skilled in the art will appreciate that various combinations of the elements described above are possible, without departing from the scope of the present invention. In particular, the control stations described above and with reference to FIG. 5 may be included in a control system such as those described with reference to FIGS. 1 to 4. It should also be understood that while the above-described embodiments pertain to a robotic lawnmower, the spirit and scope of the invention pertains more broadly to "robotic elements," meaning all devices which have a rechargeable power supply and which are configured to move within an area defined by a boundary wire. Persons skilled in the art will find that the above disclosure enables them to make and use the same, without undue experimentation.

The invention claimed is:

1. A charging and control system for a robotic element, comprising a circuit loop, the circuit loop comprising a plurality of wire segments, including one or more boundary wire segments defining the boundary of an area within which said robotic element is permitted to move;
   wherein a charging voltage signal, for charging a power source within said robotic element, and a positioning voltage signal for assisting the robotic element in determining its current position, are both communicated over the same one or more of said plurality of wire segments;
   wherein a charging station may be electrically connected to said circuit loop so as to be operable to communicate said charging voltage signal to said robotic element when positioned at said charging station.

2. A system according to claim 1, further comprising said charging station, wherein said charging station comprises one or more terminals operable to connect to said robotic element so as to communicate said charging voltage signal to said robotic element when positioned at charging station.

3. A system according to claim 2, wherein said charging station is connected to at least two of said boundary wire segments.

4. A system according to claim 3, wherein said plurality of wire segments includes two lead wire segments that extend parallel to one another and are connected at a respective end thereof to said boundary wire segments.

5. A system according to claim 4, wherein said lead wire segments are connected to said boundary wire segments via said charging station.

6. A system according to claim 1, wherein said positioning voltage signal is communicated over said boundary wire segments.

7. A system according to claim 5, wherein said charging station comprises at least one component having a capacitance sufficient to substantially block the passage of said charging signal.

8. A system according claim 1, further comprising a robotic element, wherein said boundary wire segments are operable to transmit a wireless positioning signal, corresponding to said positioning voltage signal, and said robotic element is operable to receive said positioning voltage signal and thereby determine its current relative position.

9. A system according to claim 1, further comprising:
   a power supply, operable to produce said charging voltage signal; and
   a signal generator, operable to produce said positioning voltage signal;
   wherein said power supply and said signal generator are electrically connected to said circuit loop.

10. A system according to claim 9, wherein said power supply and said signal generator are provided within a housing located remotely from said charging station.

11. A system according to claim 10, wherein said housing is electrically connected to said charging station by at least one of said one or more wire segments communicating both said charging and said positioning voltage signals.

12. A system according to claim 10, wherein said housing further provides an interface for remotely controlling and/or indicating the status of said robotic element.

13. A system according to claim 12, wherein said interface includes controls and or indicators selected from the group consisting of:
   a control, which, upon actuation, causes a robotic element positioned at said charging station to depart from the charging station to carry out desired tasks;
   a control, which, upon actuation, causes a robotic element positioned remotely from said charging station to return to the charging station;
   an indicator, which signals whether the robotic element is currently present at the charging station;
   an indicator, which signals whether the robotic element has returned to the charging station within pre-determined time-limit.
   an indicator, which signals whether the position of the robotic element has left its working area.

14. A system according to claim 12, wherein said interface effects control over said robotic element by communicating a control voltage signal over at least one of said plurality of wire segments within said circuit loop.

15. A system according to claim 14, wherein said boundary wire segments are operable to transmit a wireless control signal, corresponding to said control voltage signal, and said robotic element is operable to receive said wireless control signal.

16. A system according to claim 14, wherein said control signal is communicated by said charging station to said robotic element via said terminals.

17. A system according to claim 10, wherein said housing is electrically connected to said charging station by said lead wire segments.

18. A method for operating a robotic element, comprising the steps of:

providing a circuit loop comprising a plurality of wire segments, including one or more boundary wire segments defining the boundary of an area within which said robotic element is permitted to move;

producing a charging voltage signal for charging a power source within said robotic element;

producing a positioning voltage signal;

communicating both said charging and said positioning voltage signals over the same one or more of said plurality of wire segments in said circuit loop; and transmitting a wireless positioning signal, corresponding to said positioning voltage signal, to said robotic element, said robotic element determining its current relative position based on said wireless positioning signal.

19. A method according to claim 18, wherein said step of transmitting a wireless positioning signal comprises communicating said positioning signal over said boundary wire segments.

20. A method according to claim 18, further comprising the step of communicating said charging voltage signal to said robotic element, thereby charging a power source within said robotic element.

21. A robotic system comprising: a robotic element having an electrically rechargeable power source; a propulsion unit and a control unit for autonomous propelled movement of the robotic element over an area;

a circuit loop comprising a plurality of wire segments, including one or more boundary wire segments defining the boundary of an area within which said robotic element is permitted to move;

a charging station with which the robotic element can dock for charging of said power source; and a base station having first connections with the charging station for the supply of charging power and second connections with the circuit loop for the supply of a positioning voltage signal to said boundary wire segments;

wherein the base station comprises a user-actuable control, the base station being configured to provide a "manual depart from charging station" control signal or a "manual return to charging station" control signal in response to appropriate user actuation of said control; wherein said control signals are conveyed over the first or second connections and wherein the robotic element is configured when docked with the charging station and on receipt of said "manual depart from charging station" control signal to commence forthwith autonomous movement over said area and is configured during autonomous movement over said area and on receipt of said "manual return to charging station" control signal to cease autonomous movement and move directly to said charging station.

\* \* \* \* \*